United States Patent
Higuchi et al.

(10) Patent No.: US 11,584,353 B2
(45) Date of Patent: Feb. 21, 2023

(54) HYBRID VEHICLE CONTROL METHOD AND HYBRID VEHICLE CONTROL DEVICE

(71) Applicant: Nissan Motor Co., Ltd., Yokohama (JP)

(72) Inventors: Shinsuke Higuchi, Kanagawa (JP); Tomohiro Ariyoshi, Kanagawa (JP); Satomi Eto, Kanagawa (JP); Kazuma Sengoku, Kanagawa (JP); Junji Miyachi, Kanagawa (JP); Tetsuya Shinohara, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 209 days.

(21) Appl. No.: 16/771,994

(22) PCT Filed: Dec. 15, 2017

(86) PCT No.: PCT/JP2017/045199
§ 371 (c)(1),
(2) Date: Jun. 11, 2020

(87) PCT Pub. No.: WO2019/116571
PCT Pub. Date: Jun. 20, 2019

(65) Prior Publication Data
US 2020/0398816 A1    Dec. 24, 2020

(51) Int. Cl.
*B60W 20/12*    (2016.01)
*B60W 10/08*    (2006.01)
(Continued)

(52) U.S. Cl.
CPC ............ *B60W 20/13* (2016.01); *B60W 10/06* (2013.01); *B60W 10/08* (2013.01); *B60W 10/26* (2013.01);
(Continued)

(58) Field of Classification Search
None
See application file for complete search history.

(56) References Cited

U.S. PATENT DOCUMENTS

2009/0174538 A1 *   7/2009   Shibata .................. B60L 50/16
                                                                    340/438
2011/0260546 A1 *  10/2011   Hashizume ........... B60W 10/06
                                                                     307/75

(Continued)

FOREIGN PATENT DOCUMENTS

JP    2010-173389 A    8/2010
JP    2012-130189 A    7/2012
JP    2013-075547 A    4/2013

*Primary Examiner* — Todd Melton
*Assistant Examiner* — Jason R Roberson
(74) *Attorney, Agent, or Firm* — Young Basile Hanlon & MacFarlane, P.C.

(57) ABSTRACT

A control method for a hybrid vehicle includes a generator and an electric motor, the generator being configured to charge a battery by use of power of an engine, the electric motor being configured to drive driving wheels by electric power of the battery. The control method having driving the engine at a first rotation speed when a charging amount of the battery decreases to a first charging threshold; changing the engine to driving at a second rotation speed larger than the first rotation speed when the engine is driven at the first rotation speed and the charging amount decreases to a second charging threshold smaller than the first charging threshold; and continuing driving of the engine until the charging amount becomes equal to or more than a charging end threshold larger than the first charging threshold.

6 Claims, 10 Drawing Sheets

(51) Int. Cl.
*B60W 10/06* (2006.01)
*B60W 10/26* (2006.01)
*B60W 50/14* (2020.01)
*B60W 20/13* (2016.01)

(52) U.S. Cl.
CPC ....... *B60W 50/14* (2013.01); *B60W 2050/146* (2013.01); *B60W 2510/244* (2013.01)

(56) References Cited

U.S. PATENT DOCUMENTS

2013/0085633 A1* 4/2013 Ohno .................... B60W 10/06
  180/65.265
2013/0311028 A1* 11/2013 Ohkuma ................ B60K 6/445
  180/65.265

* cited by examiner

| STATE OF ENGINE | | SOC OF BATTERY (3) | OPERATION CHANGE |
|---|---|---|---|
| a) STOP | a-1) | ThE < SOC | NO CHANGE (STOP) |
| | a-2) | Th3 < SOC ≤ ThE | |
| | a-3) | Th1 < SOC ≤ Th3 | |
| | a-4) | Th2 < SOC ≤ Th1 | CHANGE TO N1 |
| | a-5) | SOC ≤ Th2 | CHANGE TO N2 |
| b) DRIVING AT FIRST ROTATION SPEED (N1) | b-1) | ThE < SOC | STOP |
| | b-2) | Th3 < SOC ≤ ThE | NO CHANGE (N1) |
| | b-3) | Th1 < SOC ≤ Th3 | |
| | b-4) | Th2 < SOC ≤ Th1 | |
| | b-5) | SOC ≤ Th2 | CHANGE TO N2 |
| c) DRIVING AT SECOND ROTATION SPEED (N2) | c-1) | ThE < SOC | STOP |
| | c-2) | Th3 < SOC ≤ ThE | CHANGE TO N1 |
| | c-3) | Th1 < SOC ≤ Th3 | NO CHANGE (N2) |
| | c-4) | Th2 < SOC ≤ Th1 | |
| | c-5) | SOC ≤ Th2 | |

FIG. 8

HYBRID VEHICLE CONTROL METHOD AND HYBRID VEHICLE CONTROL DEVICE

TECHNICAL FIELD

The present invention relates to a hybrid vehicle control method and a hybrid vehicle control device.

BACKGROUND ART

A hybrid vehicle disclosed in JP 2010-173389 A is an electric vehicle in which driving wheels are driven by a motor, and a generator is driven by an engine, the generator being configured to charge a battery serving as a drive source for the motor. Such an electric vehicle is called a series hybrid vehicle because the engine, the generator, and the motor are connected in series.

SUMMARY OF INVENTION

In the series hybrid vehicle, when a residual amount of the battery decreases, for example, the engine is driven regardless of an accelerator operation, so that charging is performed by the generator. Since such engine driving is performed regardless of an operation by a driver, this might give a sudden feeling to the driver.

An object of the present invention is to achieve restraint of a sudden feeling to driving sound of an engine in a hybrid vehicle.

According to a control method for a hybrid vehicle related to the present invention, the control method for a hybrid vehicle control method for a hybrid vehicle including a generator and an electric motor, the generator being configured to charge a battery by use of power of an engine, the electric motor being configured to drive driving wheels by electric power of the battery. The control method having driving the engine at a first rotation speed when a charging amount of the battery decreases to a first charging threshold; changing the engine to driving at a second rotation speed larger than the first rotation speed when the engine is driven at the first rotation speed and the charging amount decreases to a second charging threshold smaller than the first charging threshold; and continuing driving of the engine until the charging amount becomes equal to or more than a charging end threshold larger than the first charging threshold.

BRIEF DESCRIPTION OF DRAWINGS

FIG. 8 is a table illustrating operations of the charging controls.

DESCRIPTION OF EMBODIMENTS

With reference to drawings, the following describes an embodiment of the present invention.

Figure 1:
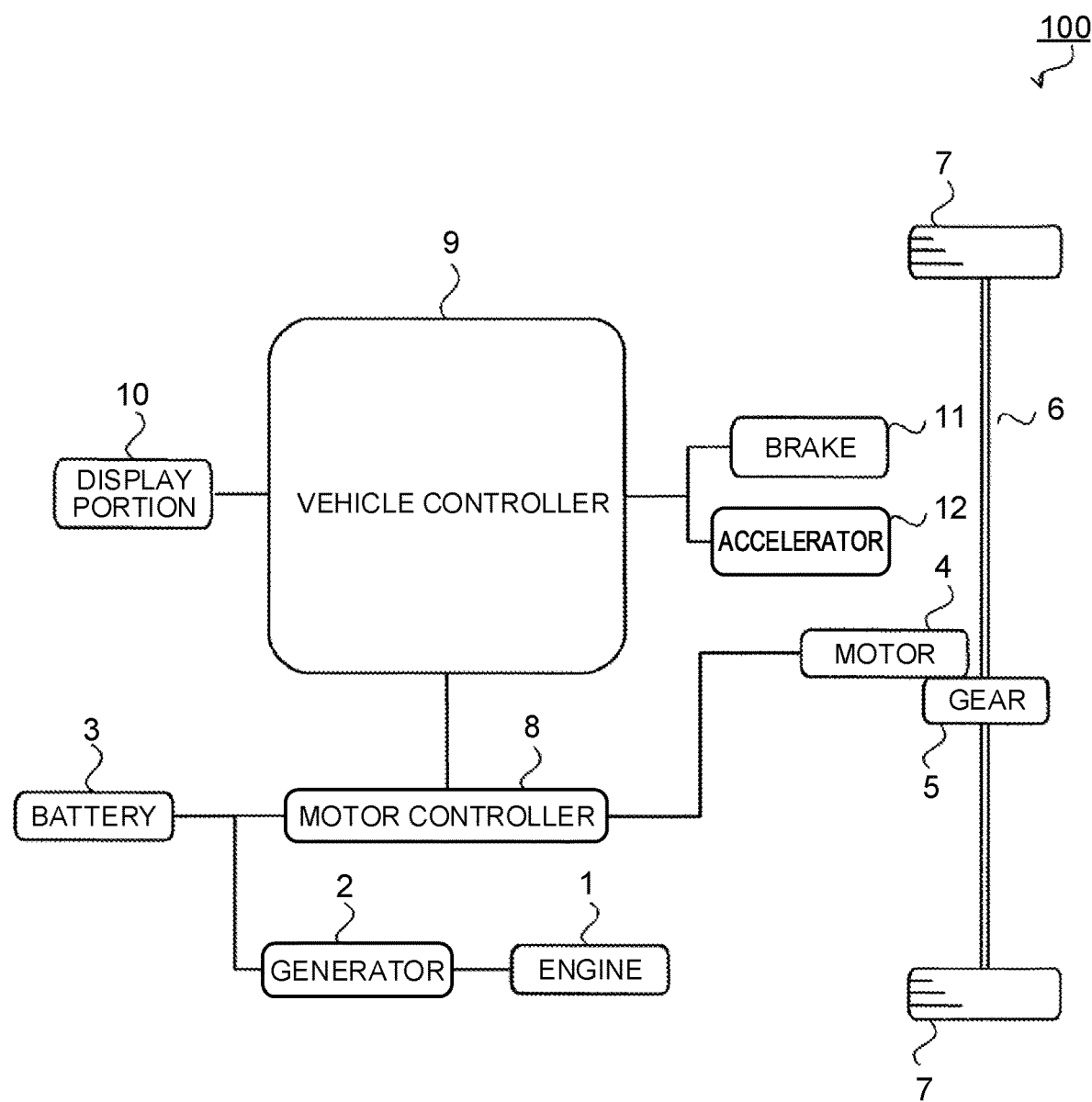
FIG. 1 is a block diagram illustrating a configuration of a hybrid vehicle according to the present embodiment.

FIG. 1 is a block diagram illustrating a configuration of a hybrid vehicle according to the embodiment of the present invention.

As illustrated in FIG. 1, a hybrid vehicle 100 includes an engine (internal combustion engine) 1, a generator 2, a battery 3, an electric motor 4, a gear 5, an axle 6, driving wheels 7, and a motor controller 8 for controlling a driving system of the hybrid vehicle 100. The hybrid vehicle 100 is provided as a so-called series-type hybrid vehicle configured to drive the driving wheels 7 such that electric power generated by the generator 2 by use of power of the engine 1 is supplied to the battery 3, and the electric motor 4 is rotated based on the electric power of the battery 3. Accordingly, in the hybrid vehicle 100, the power of the engine 1 is used not as a power source for causing the vehicle to travel but as a power source for causing the generator 2 to generate electric power.

The engine 1 is mechanically connected to the generator 2 via a speed reducer (not shown). The generator 2 is connected to the battery 3 in a power transmittable and receivable manner. Also, the battery 3 and the motor controller 8 are connected in a power transmittable and receivable manner, and the motor controller 8 and the electric motor 4 are connected in a power transmittable and receivable manner. The electric motor 4 is mechanically connected to the axle 6 via the gear 5, and the axle 6 is mechanically connected to the driving wheels 7.

A driving force of the engine 1 is transmitted to the generator 2, and the generator 2 generates electric power by the driving force of the engine 1. The electric power generated by the generator 2 is charged to the battery 3. The electric power of the battery 3 is transmitted to the electric motor 4 via the motor controller 8. The electric motor 4 is driven by the electric power of the battery 3. A driving force of the electric motor 4 is transmitted to the driving wheels 7 via the gear 5 and the axle 6. The driving wheels 7 are rotated by the driving force of the electric motor 4, so that the vehicle travels.

The hybrid vehicle 100 further includes a vehicle controller 9 for controlling the whole hybrid vehicle 100 including the motor controller 8, a display portion 10 for alternatively selecting a plurality of driving modes, a brake pedal sensor 11 for detecting a brake force, and an accelerator position sensor 12 for detecting an accelerator position (accelerator opening degree). The vehicle controller 9 functions as a control device according to the embodiment.

The vehicle controller 9 is electrically connected to the display portion 10, the brake pedal sensor 11, and the accelerator position sensor 12. The vehicle controller 9 displays states of the battery 3 and the electric motor 4 on the display portion 10 and receives a signal indicative of a brake hydraulic pressure from the brake pedal sensor 11 and a signal indicative of an accelerator position from the accelerator position sensor 12.

The vehicle controller 9 is electrically connected to the motor controller 8. The vehicle controller 9 transmits a command torque to the motor controller 8. The vehicle controller 9 receives, from the motor controller 8, a signal indicative of a motor rotation speed of the electric motor 4 and a signal indicative of gradient information of a road on which the vehicle travels.

The vehicle controller 9 is achievable, for example, by a general-purpose microcomputer including a CPU (central processing unit), a memory, and an input-output portion. A computer program (a traction control program, a charging control program, and so on) to functionalize the microcomputer as the vehicle controller 9 is installed in the microcomputer and executed. Hereby, the general-purpose microcomputer functions as the vehicle controller 9. Note that the following describes an example in which the vehicle controller 9 is implemented by software. However, it is needless to say that the vehicle controller 9 can be constituted by preparing exclusive hardware to execute various information processes described below. Further, a plurality of units included in the vehicle controller 9 may be each constituted by individual hardware. Further, not only the vehicle controller 9, but also the motor controller 8 is achievable as software or exclusive hardware in a similar manner. Furthermore, the vehicle controller 9 and the motor controller 8 may further double as an electronic control unit (ECU) to be used for other controls for the vehicle.

Figure 2:
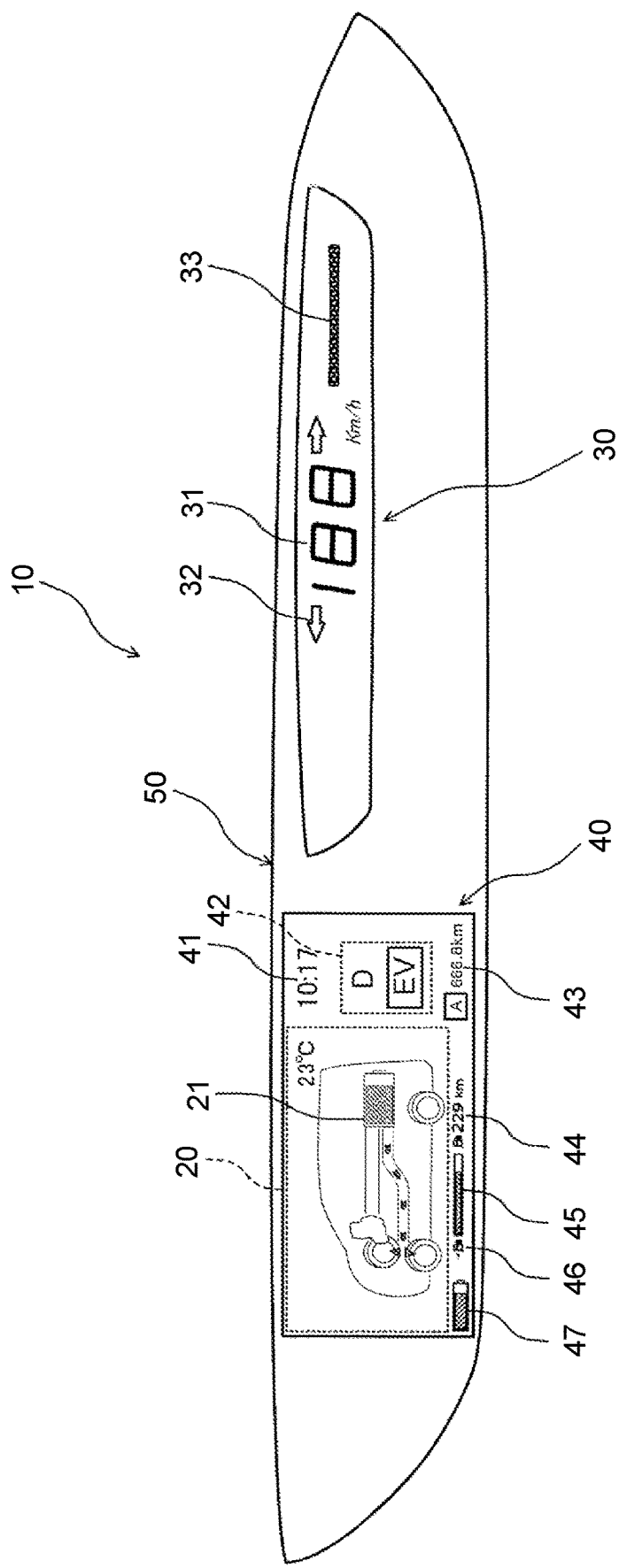
FIG. 2 is a view illustrating an example of a display screen on a display portion.

FIG. 2 is a view illustrating an example of a display screen on the display portion 10.

The display portion 10 illustrated in FIG. 2 includes a display device 50 constituted by a display incorporated into an instrument panel placed on the front side of a vehicle cabin in the hybrid vehicle 100. A display function of the display device 50 can be implemented by various image display devices such as a liquid crystal display, an organic EL, and an LED, for example. The display device 50 is configured to perform displaying based on a display control signal from the vehicle controller 9.

The display device 50 includes a first display region 30 placed close to the right side in FIG. 2, and a second display region 40 placed close to the left side in FIG. 2.

The first display region 30 includes a vehicle speed display portion 31 on which a current vehicle speed of the hybrid vehicle 100 is displayed, and a direction indication display portion 32 displayed at the time when the hybrid vehicle 100 turns right or left. Further, an eco-level gauge 33 indicative of an eco-drive degree of the hybrid vehicle 100 is displayed on the right of the first display region 30. An eco-level is an index indicating stepwise how good the power efficiency (energy consumption efficiency) of a current driving state of the hybrid vehicle 100 is. In the present embodiment, by displaying the eco-level gauge 33 to expand and contract in accordance with the rise and fall of the eco-level that corresponds to a motor output, an index indicative of how much a current eco-drive degree is can be provided to a driver.

The second display region 40 includes a vehicle state display portion 20, a battery icon 21 indicative of a state of the battery 3, a time display portion 41 configured to display the current time, and a driving mode display portion 42 on which a currently set driving mode and a range position of a shift lever are displayed. Further, the second display region 40 includes a trip information display portion 43 indicative of a travel distance in one trip, a travelable distance display portion 44 indicative of a travelable distance based on a residual amount of fuel accumulated in a fuel tank for power generation of the engine 1, a fuel residual amount display portion 45 indicative of a fuel residual amount in the fuel tank, a fuel filler position display portion 46 on which a position (a right position or a left position) where a fuel filler is provided is displayed, and a charging amount display portion 47 on which a charging amount (State of Charge: SOC) of the battery 3 is displayed.

A predetermined vehicle state display can be displayed selectively from a plurality of types of vehicle state displays on the vehicle state display portion 20 in the second display region 40 by an operation by a driver or the like. The plurality of vehicle state displays includes an energy flow display to display energy flows between the engine 1 and the battery 3 and between the battery 3 and the driving wheels 7, a power meter display to display a drive output amount or a regeneration amount by the electric motor 4, a charging history information display indicative of a history of a charging amount of charging by use of the engine 1 or regeneration charging by use of the electric motor 4, and so on. The present embodiment describes a case where the energy flow display is displayed on the vehicle state display portion 20.

Figure 3:
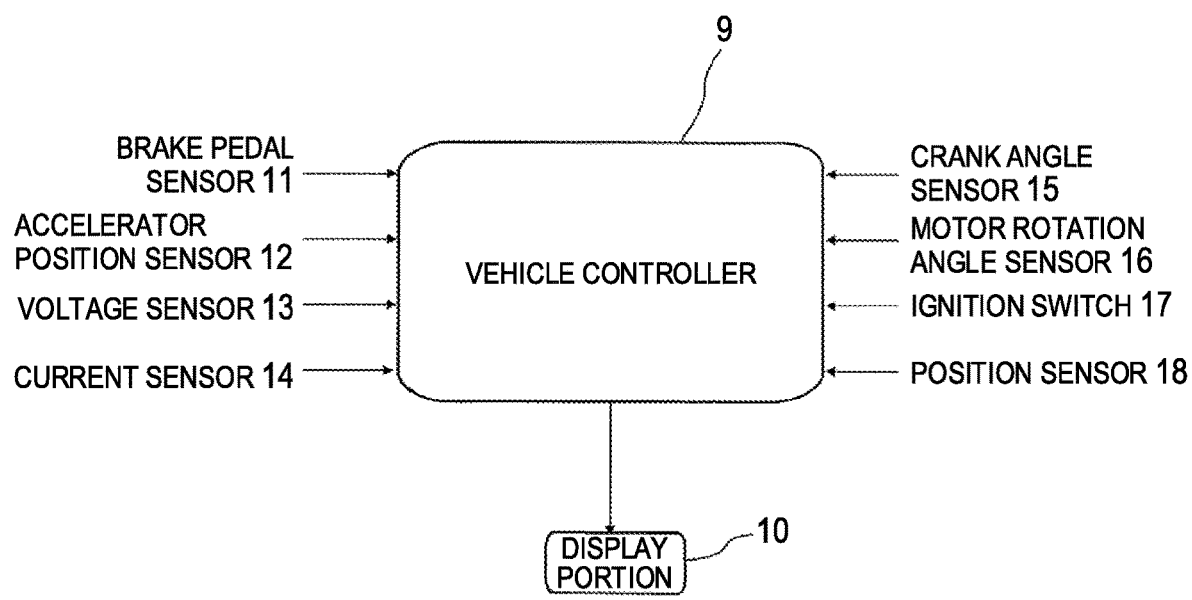
FIG. 3 is a view illustrating a configuration related to a vehicle controller.

FIG. 3 is a block diagram around the vehicle controller 9. As illustrated in this figure, the vehicle controller 9 is electrically connected to various sensors for detecting a driving state of the hybrid vehicle 100. The various sensors include a voltage sensor 13, a current sensor 14, a crank angle sensor 15, a motor rotation angle sensor 16, an ignition switch 17, a position sensor 18, and so on in addition to the brake pedal sensor 11 and the accelerator position sensor 12 illustrated in FIG. 1. These sensors are examples of a sensor for detecting a driving state of the vehicle and do not exclude cases where the vehicle controller 9 is connected to sensors other than them.

The brake pedal sensor 11 is a sensor for detecting a stepping amount of a brake pedal provided in the hybrid vehicle 100, and the accelerator position sensor 12 is a sensor for detecting a stepping amount of an accelerator pedal provided in the hybrid vehicle 100. The stepping amount of the accelerator pedal is vehicle state information representing a load to the electric motor 4, and the stepping amount of the brake pedal is vehicle state information representing a braking amount.

The voltage sensor 13 and the current sensor 14 are provided in the battery 3 and detect a battery voltage and a battery current at the time of charging and discharging.

The crank angle sensor 15 is provided in the engine 1 and detects a rotation position of a crankshaft of the engine 1. The motor rotation angle sensor 16 is provided in the electric motor 4 and detects a rotation position of a rotor of the electric motor 4. The vehicle controller 9 calculates an engine rotation speed based on a detection signal of the crank angle sensor 15 and calculates a motor rotation speed based on a detection signal of the motor rotation angle sensor 16.

The ignition switch 17 is a power switch to be operated by a driver or the like so that the hybrid vehicle 100 is brought into a travelable state.

The position sensor 18 is a sensor for detecting the range position of the shift lever provided in the hybrid vehicle 100. The range position of the shift lever includes a parking range (P range), a neutral range (N range), a forward travel range (D-range), a reverse travel range (R range), and so on.

The vehicle controller 9 calculates energy flow information indicative of a power supply state between the engine 1 and the battery 3, a power supply state between the battery 3 and the electric motor 4, and the like based on detection signals from the various sensors described above, and the vehicle controller 9 also calculates a display command signal for controlling the display device 50 based on the energy flow information and so on. Various pieces of information related to energy flows are displayed on the vehicle state display portion 20 (see FIG. 2) of the display device 50 based on the display command signal from the vehicle controller 9. Note that the energy flow information includes generated power by the generator 2, driving power supplied to the electric motor 4, regenerative power by the electric motor 4, and so on.

Here, in the series hybrid vehicle, when the SOC of the battery 3 becomes lower than a predetermined value, the vehicle controller 9 rotates the engine 1 so as to rotate the generator 2 so that the battery 3 is charged. When the SOC reaches another predetermined value, the engine 1 is stopped so that the charging is terminated. Further, in the present embodiment, the engine 1 is configured to be driven at two stages of rotation speed, i.e., a low output as a relatively low first rotation speed N1 at which driving sound is lower than a noise standard, and a high output as a second rotation speed N2 which is larger than the first rotation speed N1 and at which the engine 1 is driven with optimum fuel efficiency, as described below. The following describes a charging control by the vehicle controller 9 with reference to FIGS. 4 to 7.

Figure 4:
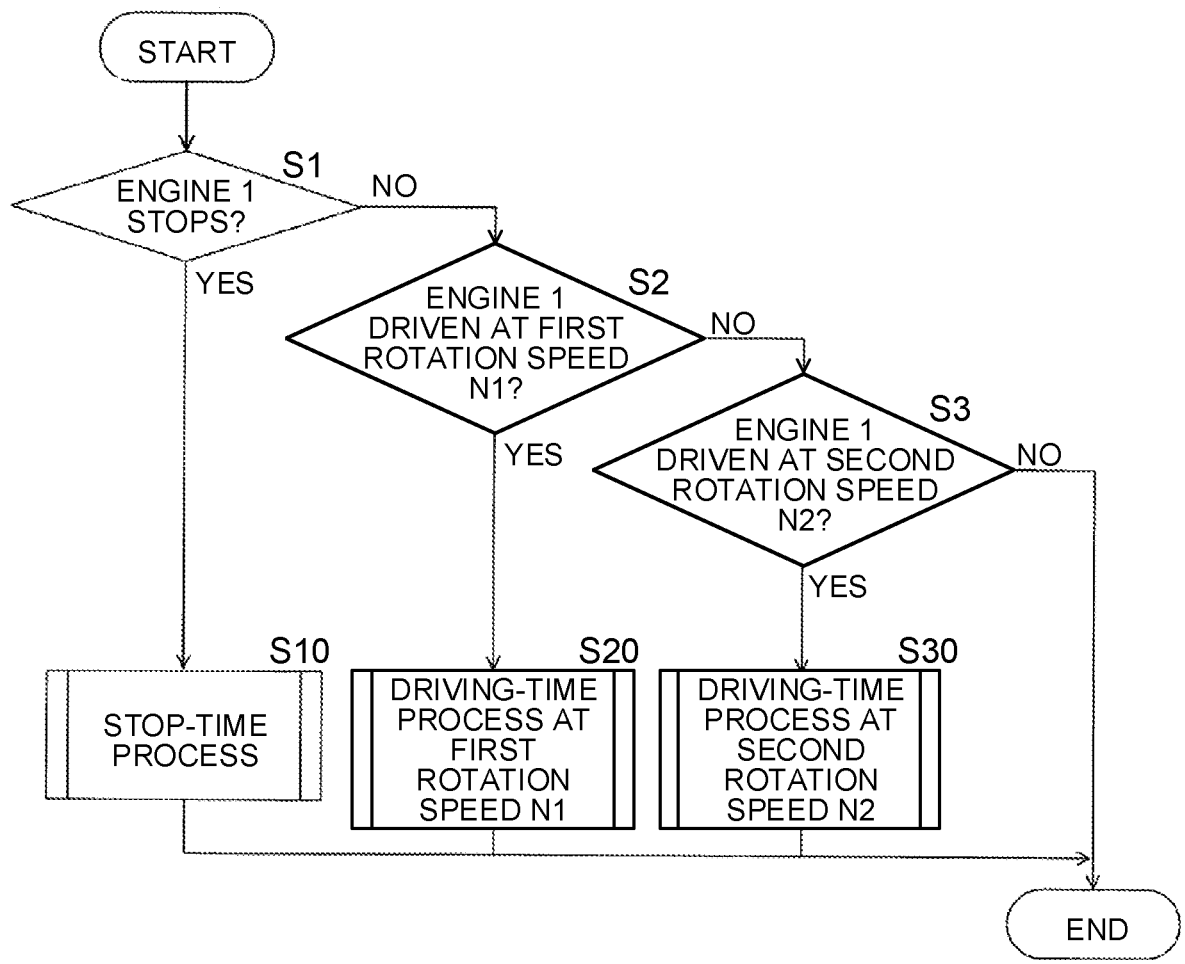
FIG. 4 is a flowchart of a charging control.

FIG. 4 is a flowchart illustrating the charging control performed by the vehicle controller 9. The vehicle controller 9 calculates an engine rotation speed based on a detection signal of the crank angle sensor 15 and selects a process corresponding to each driving state of the engine 1.

In step S1, the vehicle controller 9 determines whether or not the rotation speed of the engine 1 is zero and the engine 1 stops. When the engine 1 stops (S1: Yes), the vehicle controller 9 performs a stop-time process in step S10. When the engine 1 does not stop (S1: No), the vehicle controller 9 subsequently performs a process of step S2.

In step S2, the vehicle controller 9 determines whether or not the engine 1 is driven at the first rotation speed N1. When the engine 1 is driven at the first rotation speed N1 (S2: Yes), the vehicle controller 9 subsequently performs a driving-time process at the first rotation speed N1 in step S20. When the engine 1 does not rotate at the first rotation speed N1 (S2: No), the vehicle controller 9 subsequently performs a process of step S3.

In step S3, the vehicle controller 9 determines whether or not the engine 1 is driven at the second rotation speed N2. When the engine 1 is driven at the second rotation speed N2 (S3: Yes), the vehicle controller 9 subsequently performs a driving-time process at the second rotation speed N2 in step S30. When the engine 1 is not driven at the second rotation speed N2 (S3: No), the vehicle controller 9 ends the charging control.

As such, the vehicle controller 9 determines a subsequent process based on the rotation speed of the engine 1 in accordance with the flowchart illustrated in FIG. 4.

Figure 5:
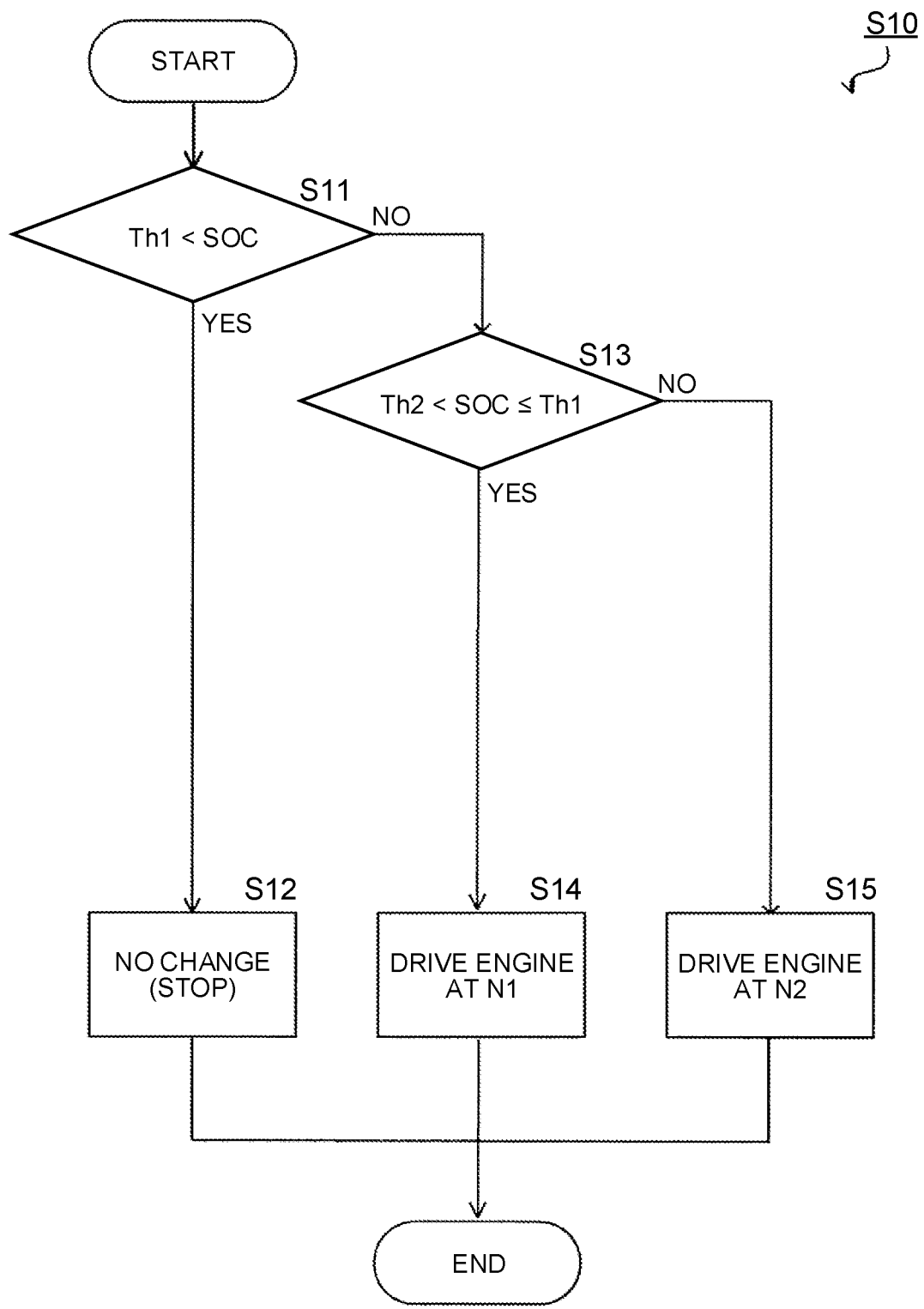
FIG. 5 is a flowchart of a charging control.
Figure 6:
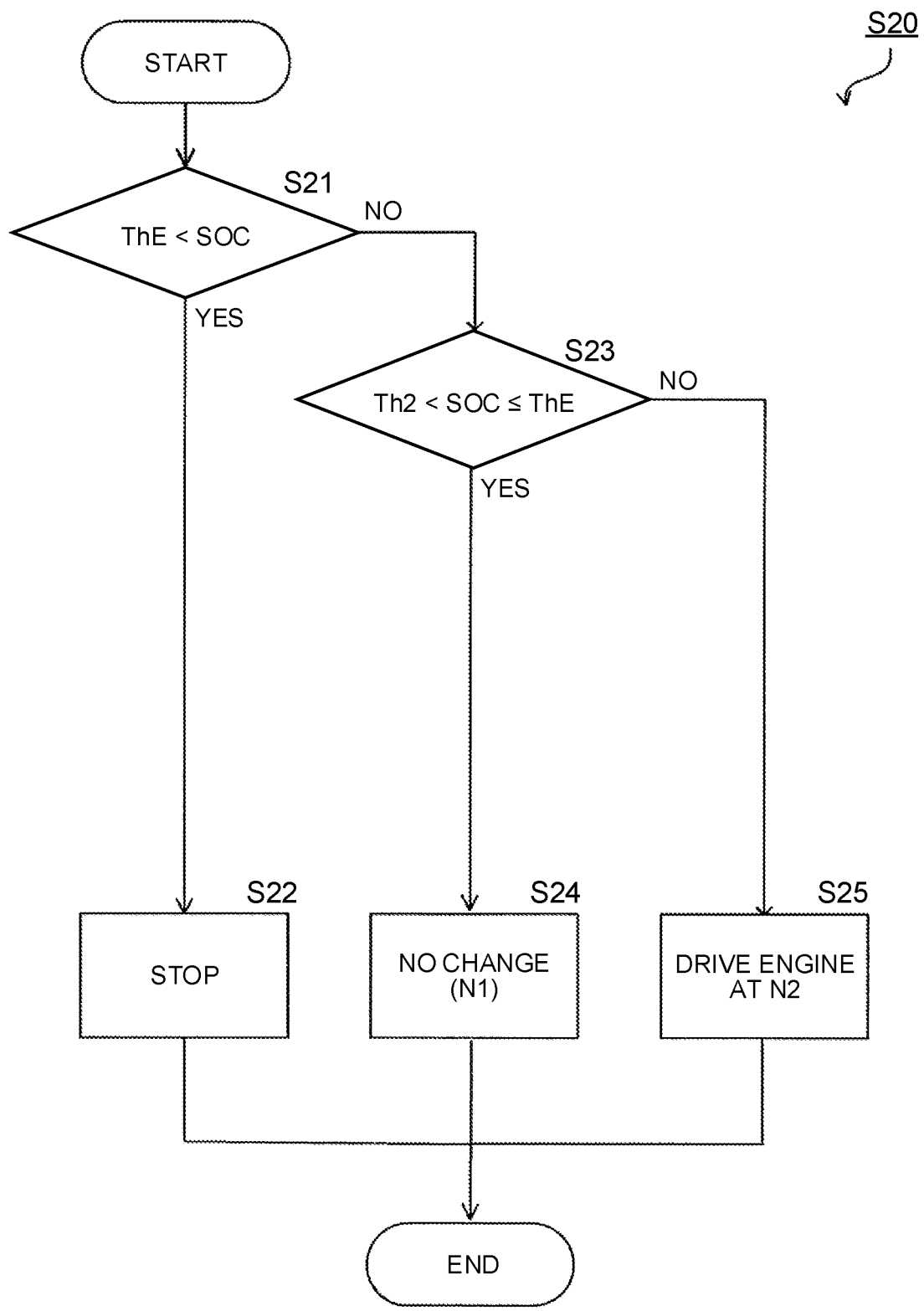
FIG. 6 is a flowchart of a charging control.
Figure 7:
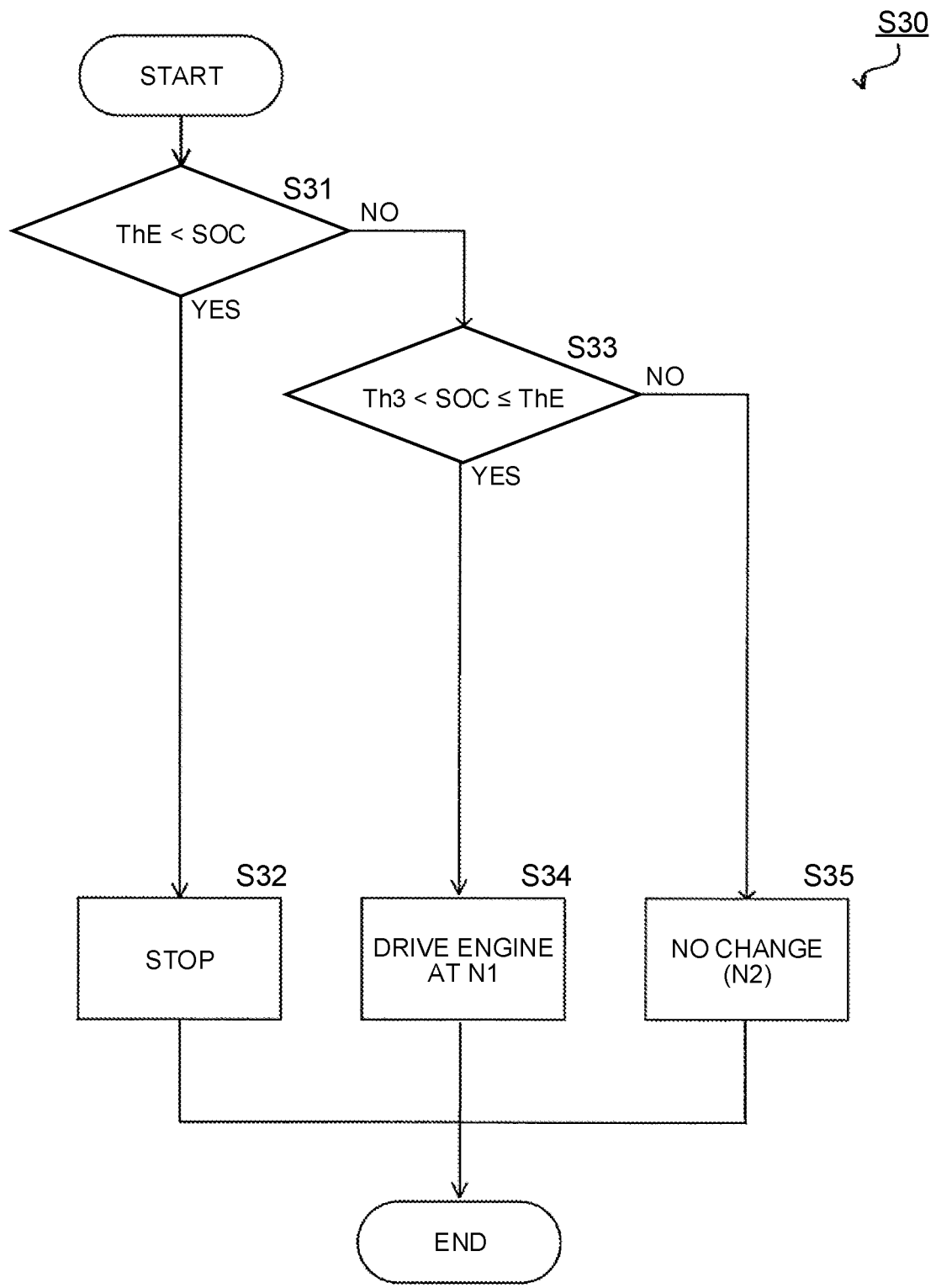
FIG. 7 is a flowchart of a charging control.

With reference to FIGS. 5 to 7, next will be described the stop-time process of the engine 1 in step S10, the process in step S20 in which the engine 1 is driven at the first rotation speed N1, and the process in step S30 in which the engine 1 is driven at the second rotation speed N2. Note that, in these processes, the vehicle controller 9 calculates the SOC based on detection signals from the voltage sensor 13 and the current sensor 14 and performs a process corresponding to an SOC calculation value.

FIG. 5 is a flowchart illustrating a charging control at the time of stop of the engine 1 in step S10. Note that a first charging threshold Th1 indicates a value to start charging by driving the engine 1 at the first rotation speed N1 when the SOC becomes lower than this value. A second charging threshold Th2 is a value smaller than the first charging threshold Th1 and indicates a value to start charging by driving the engine 1 at the second rotation speed N2 when the SOC becomes lower than this value.

In step S11, the vehicle controller 9 determines whether or not the SOC is larger than the first charging threshold Th1.

When the SOC is larger than the first charging threshold Th1 (S11: Yes), the vehicle controller 9 proceeds to a process of step S12. In step S12, the vehicle controller 9 determines that driving of the engine 1 is not necessary and continues the stop state without changing the driving state of the engine 1.

When the SOC is equal to or less than the first charging threshold Th1 (S11: No), the vehicle controller 9 proceeds to a process of step S13. In step S13, the vehicle controller 9 determines whether or not the SOC is in a range larger than the second charging threshold Th2 but equal to or less than the first charging threshold Th1.

When the SOC is in the range larger than the second charging threshold Th2 but equal to or less than the first charging threshold Th1 (S13: Yes), the vehicle controller 9 determines that the SOC is relatively small and charging by driving of the engine 1 is required, and the vehicle controller 9 proceeds to a process of step S14. In step S14, the vehicle controller 9 drives the engine 1 at a low output at the first rotation speed N1.

When the SOC is not in the range (S13: No), that is, when the SOC is equal to or less than the second charging threshold Th2, the vehicle controller 9 determines that the SOC is extremely small and the battery 3 needs to be charged by driving the engine 1 at a high output, and the vehicle controller 9 subsequently performs a process of step S15. In step S15, the vehicle controller 9 drives the engine 1 at a high output at the second rotation speed N2.

Note that, generally, before the SOC becomes equal to or less than the second charging threshold Th2, the SOC becomes equal to or less than the first charging threshold Th1, so that the engine 1 is driven at the first rotation speed N1 (S14). On this account, the possibility that the engine stops and the SOC becomes equal to or less than the second charging threshold Th2 (S13: Yes) is low, and therefore, this process is provided as a failsafe process.

FIG. 6 is a flowchart illustrating a charging control when the engine 1 is driven at the first rotation speed N1. Note that a charging end threshold ThE indicates a value to stop driving of the engine 1 and stop charging when the SOC exceeds this value.

In step S21, the vehicle controller 9 determines whether or not the SOC is larger than the charging end threshold ThE.

When the SOC is larger than the charging end threshold ThE (S21: Yes), the vehicle controller 9 determines that the SOC is sufficient, and the vehicle controller 9 subsequently performs a process of step S22. In step S22, the vehicle controller 9 stops the engine 1.

When the SOC is equal to or less than the charging end threshold ThE (S21: No), the vehicle controller 9 subsequently performs a process of step S23. In step S23, the vehicle controller 9 determines whether or not the SOC is in a range larger than the second charging threshold Th2 but equal to or less than the charging end threshold ThE.

When the SOC is in the range larger than the second charging threshold Th2 but equal to or less than the charging end threshold ThE (S23: Yes), the vehicle controller 9 determines that the engine 1 does not need to be driven at a high output because the SOC does not decrease to the second charging threshold Th2 and the SOC is relatively large, so that the vehicle controller 9 subsequently performs a process of step S24. In step S24, the vehicle controller 9 continues driving of the engine 1 at a low output at the first rotation speed N1 without changing the driving state of the engine 1.

When the SOC is not in the range (S23: No), that is, when the SOC is equal to or less than the second charging threshold Th2, the vehicle controller 9 determines that the SOC is extremely small and charging is required by driving the engine 1 at a high output, and the vehicle controller 9 proceeds to a process of step S25. In step S25, the vehicle controller 9 changes the engine 1 to driving at a high output at the second rotation speed N2.

FIG. 7 is a flowchart illustrating a charging control corresponding to the SOC when the engine 1 is driven at the second rotation speed N2. Note that a third charging threshold Th3 is a value larger than the second charging threshold Th2 but smaller than the charging end threshold ThE and indicates a value to change the engine 1 to driving at the first rotation speed N1 when the SOC exceeds this value in a case where the engine 1 is driven at the second rotation speed N2.

In step S31, the vehicle controller 9 determines whether or not the SOC is larger than the charging end threshold ThE.

When the SOC is larger than the charging end threshold ThE (S31: Yes), the vehicle controller 9 determines that the SOC is sufficient and charging is not required, and the vehicle controller 9 subsequently performs a process of step S32. In step S32, the vehicle controller 9 stops the engine 1.

Note that, generally, before the SOC exceeds the charging end threshold ThE, the SOC exceeds the third charging threshold Th3, so that the engine 1 is driven at the first rotation speed N1. Accordingly, the possibility that the engine 1 is driven at the second rotation speed N2 and the SOC becomes larger than the charging end threshold ThE is low, and therefore, this process is provided as a failsafe process.

When the SOC is equal to or less than the charging end threshold ThE (S31: No), the vehicle controller 9 subsequently performs a process of step S33. In step S33, the vehicle controller 9 determines whether or not the SOC is in a range larger than the third charging threshold Th3 but equal to or less than the charging end threshold ThE.

When the SOC is in the range larger than the third charging threshold Th3 but equal to or less than the charging end threshold ThE (S33: Yes), the vehicle controller 9 determines that the SOC is relatively large and the engine 1 can be changed to driving at a low output, and the vehicle controller 9 subsequently performs a process of step S34. In step S34, the vehicle controller 9 changes the engine 1 to driving at a low output at the first rotation speed N1.

When the SOC is not in the range (S33: No), that is, when the SOC is equal to or less than the third charging threshold, the vehicle controller 9 determines that the SOC is insufficient and driving of the engine 1 at a high output is continued, and the vehicle controller 9 subsequently performs a process of step S35. In step S35, the vehicle controller 9 continues driving at the second rotation speed N2 without changing the driving state of the engine 1.

FIG. 8 is a table illustrating a summary of the charging controls by the vehicle controller 9.

In this table, the vehicle controller 9 changes the driving state of the engine 1 in accordance with the state of the engine 1 that is determined from an engine rotation speed calculated based on the detection signal of the motor rotation angle sensor 16, and the SOC of the battery 3 that is calculated based on the detection signals of the voltage sensor 13 and the current sensor 14.

(a) In a case where the engine 1 stops, the following operation is performed. (a-1 to a-3) When the SOC is larger than the first charging threshold Th1, the engine 1 is stopped so as to keep a state where power generation by the generator 2 is not performed. (a-4) When the SOC is larger than the second charging threshold Th2 but equal to or less than the first charging threshold Th1, the engine 1 is driven at the first rotation speed N1. (a-5) When the SOC is equal to or less than the second charging threshold Th2, the engine 1 is driven at the second rotation speed N2.

(b) When the engine 1 operates at the first rotation speed N1, the following operation is performed. (b-1) When the SOC is larger than the charging end threshold ThE, the engine 1 is stopped. (b-2 to b-4) When the SOC is larger than the second charging threshold Th2 but equal to or less than the charging end threshold ThE, the engine 1 is kept driven at the first rotation speed N1. (b-5) When the SOC is equal to or less than the second charging threshold Th2, the engine 1 is changed to driving at the second rotation speed N2.

(c) When the engine 1 operates at the second rotation speed N2, the following operation is performed. (c-1) When the SOC is larger than the charging end threshold ThE, the engine 1 is stopped. (c-2) When the SOC is larger than the third charging threshold Th3 but equal to or less than the charging end threshold ThE, the engine 1 is changed to driving at the first rotation speed N1. (c-3) When the SOC is equal to or less than the third charging threshold Th3, the engine 1 is kept driven at the second rotation speed N2.

Figure 9:
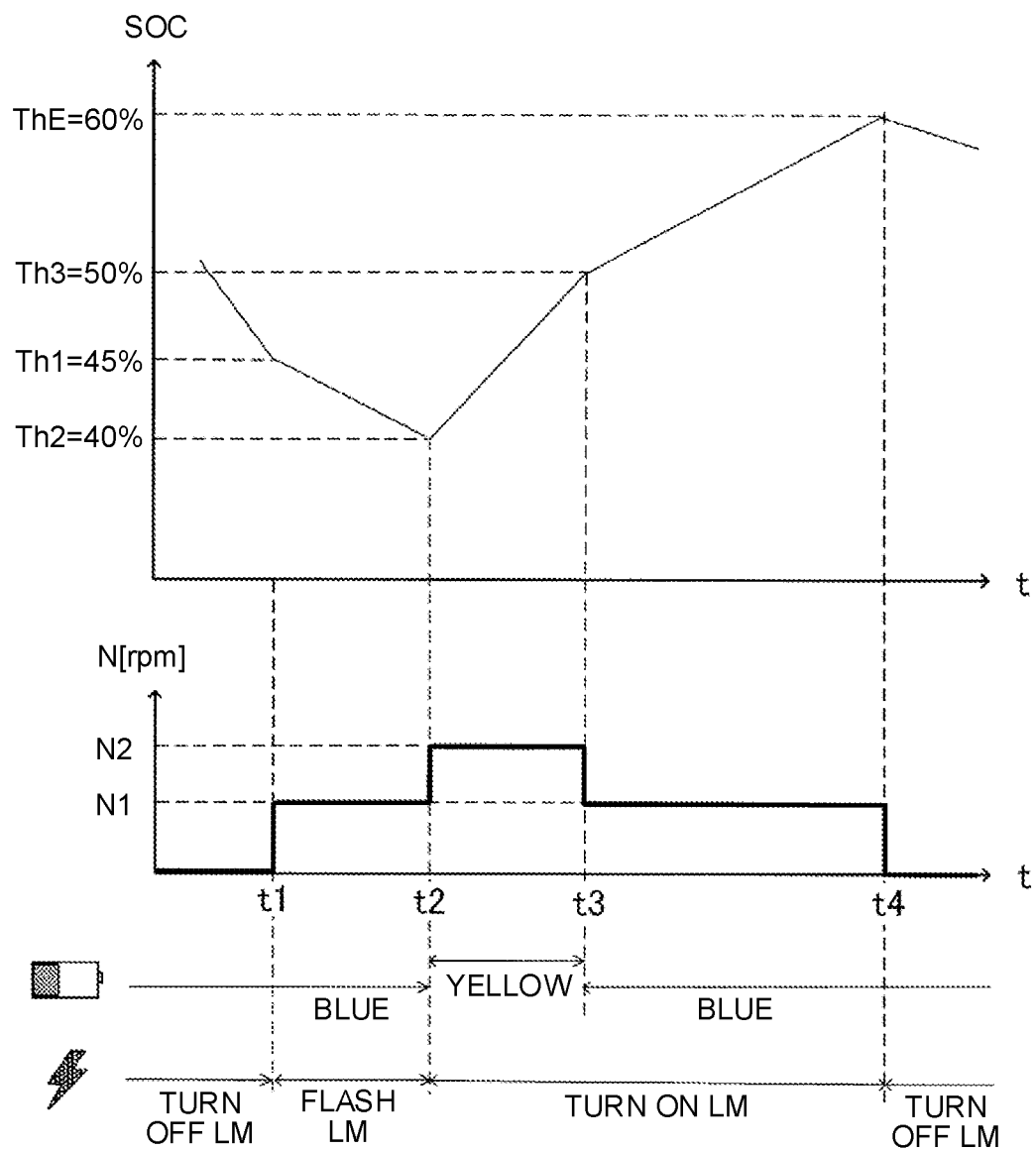
FIG. 9 is a timing chart in a case where the charging controls are performed.

FIG. 9 illustrates a timing chart in a case where the charging controls illustrated in FIGS. 4 to 7 are performed.

Figure 10:
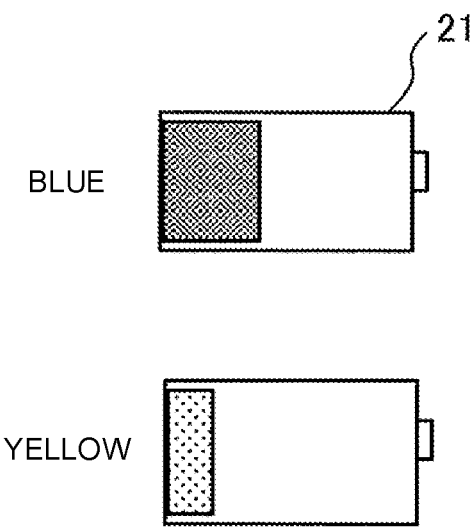
FIG. 10 is a view illustrating a change in a display mode of a battery in FIG. 2.
Figure 11:
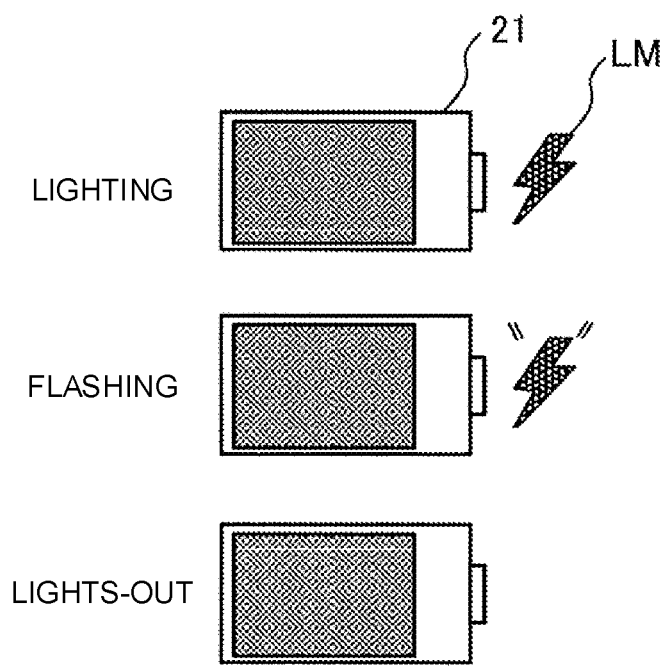
FIG. 11 is a view illustrating changes in the display mode of the battery in FIG. 2.

As described above, the vehicle controller 9 determines the operation of the engine 1 based on the operation state of the engine 1 and the SOC of the battery 3. Note that, in this figure, time is indicated by the horizontal axis. In the upper part, the SOC is indicated by the vertical axis, and in the central part, the rotation speed N [rpm] of the engine 1 is indicated by the vertical axis. Further, in the lower part of the figure, a display mode of an icon indicative of a vehicle state to be displayed on the vehicle state display portion 20 in the second display region 40 by the display portion 10 is illustrated. Note that the display mode is illustrated in FIGS. 10 and 11 and will be described later.

Further, the first charging threshold Th1 is 45%, the second charging threshold Th2 is 40%, the third charging threshold Th3 is 50%, and the charging end threshold ThE is 60%. Note that these values are examples and shall be modifiable appropriately.

Before time t1, the hybrid vehicle 100 travels by a driving force of the electric motor 4 in a state where the engine 1 stops, so that the SOC decreases gradually.

At time t1, when the vehicle controller 9 detects that the SOC decreases to 45% that is the first charging threshold Th1 (S13: Yes) in a state where the engine 1 stops (S10), the vehicle controller 9 drives the engine 1 at the first rotation speed N1 (S14).

Generally, when the engine 1 is driven at the first rotation speed N1, charging of the battery 3 is started. However, in this timing chart, it is assumed that a consuming amount of electric power in the whole hybrid vehicle 100 exceeds a power generation amount, and the SOC decreases gradually.

At time t2, when the vehicle controller 9 detects that the SOC decreases to 40% that is the second charging threshold Th2 (S23: No) in a state where the engine 1 is driven at the first rotation speed N1 (S20), the vehicle controller 9 changes the engine 1 to driving at the second rotation speed N2 (S25). When the engine 1 is driven at the second rotation speed N2 that is relatively high as such, the power generation amount increases. Hereby, the power generation amount of electric power in the whole hybrid vehicle 100 exceeds the consuming amount, so that the SOC increases gradually.

At time t3, when the vehicle controller 9 detects that the SOC increases to 50% that is the third charging threshold Th3 (S33: Yes) in a state where the engine 1 is driven at the second rotation speed N2 (S30), the vehicle controller 9 changes the engine 1 to driving at the first rotation speed N1 (S34). Even in this case, the power generation amount of electric power in the whole hybrid vehicle 100 exceeds the consuming amount, so that the SOC increases gradually.

At time t4, when the vehicle controller 9 detects that the SOC increases to 60% that is the charging end threshold ThE (S21: Yes) in a state where the engine 1 is driven at the first rotation speed N1 (S20), the vehicle controller 9 stops the engine 1 so as to terminate power generation (S22). That is, the vehicle controller 9 continues driving of the engine 1 until the SOC becomes equal to or more than the charging end threshold ThE.

With such a configuration, in a case where it is necessary to charge the battery 3, the engine 1 can be driven at the first rotation speed N1 that is relatively low without being continuously driven at the second rotation speed N2. Accordingly, it is possible to increase opportunities in which the driving sound of the engine 1 becomes lower than a predetermined noise standard.

Further, the third charging threshold Th3 is set to a value larger than the first charging threshold Th1. Hereby, even in a case where, after the SOC exceeds the third charging threshold Th3 and the engine 1 is changed to driving at the first rotation speed N1, the consuming amount of electric power in the whole hybrid vehicle 100 exceeds the power generation amount and the SOC decreases, it is possible to restrain such a situation that the SOC immediately becomes lower than the second charging threshold Th2 and the engine 1 is changed to driving at the second rotation speed N2.

Further, as an icon indicative of the battery 3 among the vehicle states to be displayed on the vehicle state display portion 20 in the second display region 40 by the display portion 10, the vehicle controller 9 shows the SOC of the battery 3 in the form of a length of a bar and shows a lightning mark LM indicative of a charged state. Details of the icon will be described with reference to FIGS. 10 and 11.

As illustrated in FIG. 10, a battery icon 21 displayed on the vehicle state display portion 20 of the second display region 40 in the display portion 10 includes a display of a blue bar, and the length of the bar changes depending on the SOC of the battery 3. Further, in a case where the SOC becomes smaller than the second charging threshold Th2 and the engine 1 rotates at the second rotation speed N2, the color of the bar indicative of the SOC is changed into yellow.

That is, in a case where the engine 1 stops or the engine 1 is driven at the first rotation speed N1, the bar of the battery icon 21 is displayed in blue. In the timing chart illustrated in FIG. 9, this case corresponds to a state before time t2 and a state after time t3.

In the meantime, in a case where the engine 1 is driven at the second rotation speed N2, the bar of the battery icon 21 is displayed in yellow. In FIG. 9, this case corresponds to a state between time t2 and time t3. As such, the display mode of the color of the bar of the battery icon 21 is changed for the case where the rotation speed of the engine 1 is the first rotation speed N1 and for the case where the rotation speed of the engine 1 is the second rotation speed N2, thereby allowing a driver to know the rotation state of the engine 1.

Further, as illustrated in FIG. 11, the lightning mark LM may be displayed on the right of the battery icon 21 in the display portion 10. The lightning mark LM is displayed in three modes of lighting, flashing, and lights-out.

In a case where the SOC of the battery 3 increases, the vehicle controller 9 turns on the lightning mark LM. For example, in FIG. 9, the lightning mark LM is turned on in a range from time t2 to time t4.

In a case where the battery 3 is not charged or discharged, the vehicle controller 9 turns off the lightning mark LM. For example, in FIG. 9, the lightning mark LM is turned off before time t1 and after time t4.

In a case where, although regenerative braking by the electric motor 4 or power generation by the engine 1 is performed, the power generation amount of electric power in the whole hybrid vehicle 100 becomes lower than the consuming amount and the SOC decreases, the vehicle controller 9 flashes the lightning mark LM. In the timing chart illustrated in FIG. 9, the lightning mark LM is flashed between time t1 and time t2.

When the display of the battery 3 is changed as such, the state of charging and discharging of the battery 3 can be exhibited, thereby making it possible to improve convenience for a user.

The present embodiment can yield the following effects.

In the hybrid vehicle control method according to the present embodiment, when the charging amount (SOC) of the battery 3 decreases to the first charging threshold Th1, the engine 1 is driven at the first rotation speed N1. Further, when the SOC decreases to the second charging threshold Th2, the engine 1 is changed to driving at the second rotation speed N2. Finally, the vehicle controller 9 continues driving of the engine 1 until the SOC becomes equal to or more than the charging end threshold ThE, and when the SOC increases to the charging end threshold ThE, the engine 1 is stopped.

If the SOC increases by driving the engine 1 at the first rotation speed N1 after the SOC decreases to the first charging threshold Th1, the SOC does not decrease to the second charging threshold Th2, so that the engine 1 is not driven at the second rotation speed N2. In the meantime, if the SOC decreases even by driving the engine 1 at the first rotation speed N1 after the SOC decreases to the first charging threshold Th1, the engine 1 is driven at the second rotation speed N2 at a stage where the SOC decreases to the second charging threshold Th2.

Here, in a case where the engine 1 is driven at the second rotation speed N2, there is such a problem that driving sound is large. In contrast, the first rotation speed N1 is a relatively small rotation speed, and therefore, driving sound is also small. In the present embodiment, the engine 1 is driven at the second rotation speed N2 only if necessary without being continuously driven at the second rotation speed N2, as described above. This can restrain an opportunity of driving at the second rotation speed N2, thereby making it possible to restrain generation of large driving sound of the engine 1. Further, when the SOC decreases to the second charging threshold Th2 after the SOC decreases to the first charging threshold Th1 and the engine 1 starts rotating at the first rotation speed N1, the engine 1 is driven at the second rotation speed N2 that is relatively high. This makes it possible to restrain a sudden feeling to a driver, the sudden feeling being caused when the engine 1 is suddenly driven at the second rotation speed N2 that is relatively high from a state where the engine 1 stops.

In the hybrid vehicle control method according to the present embodiment, in a case where the engine 1 is driven at the second rotation speed N2 and the SOC increases to the third charging threshold Th3 that is smaller than the charging end threshold ThE, the engine 1 is changed to driving at the first rotation speed N1.

In such a configuration, before the SOC exceeds the charging end threshold ThE and the engine 1 stops, the SOC exceeds the third charging threshold Th3, so that the engine 1 is changed to driving at the first rotation speed N1. This makes it possible to reduce opportunities in which the engine 1 is rotated at the second rotation speed N2 that causes relatively large driving sound, thereby making it possible to restrain the driving sound of the engine 1.

In the hybrid vehicle control method according to the present embodiment, the bar the length of which changes depending on the SOC is displayed on the display portion 10. The bar is displayed in blue in a case where the engine 1 stops or the engine 1 is driven at the first rotation speed N1. The bar is displayed in yellow in a case where the engine 1 is driven at the second rotation speed N2.

For example, when driving of the engine 1 at the second rotation speed N2 is started, the driving sound of the engine 1 increases. In such a case, the driving sound of the engine 1 increases, but the display mode of the bar is changed to yellow, so that the driver can find that the engine 1 is driven at the second rotation speed N2 that is relatively high. This allows the driver to know the state of the engine 1, thereby making it possible to improve convenience for the user.

In the hybrid vehicle control method according to the present embodiment, the display mode of the battery 3 on the display portion 10 is changed for a case where the battery 3 is charged, for a case where the battery 3 is discharged, and for a case where the engine 1 is driven but the battery 3 is discharged because the consuming amount of electric power in the whole hybrid vehicle 100 exceeds the power generation amount. More specifically, the lightning mark LM is flashed between time t1 and time t2 in the timing chart illustrated in FIG. 9.

Generally, in a case where the engine 1 is driven, the battery 3 is charged. However, in a case where the engine 1 is driven at the first rotation speed N1, the power generation amount is relatively small. Accordingly, in some cases, the consuming amount of electric power in the whole hybrid vehicle 100 exceeds the power generation amount, so that the battery 3 is discharged without being charged. In such cases, the driver can find, by the change of the display mode, that the battery 3 is discharged though the engine 1 is driven, thereby making it possible to improve convenience for the user. The driver thus finding the state of the battery 3 can charge the battery by restraining discharging of the battery 3 by a driving operation or the like in which the driver does not strongly step on an accelerator so as to restrain the consuming amount of electric power.

The present embodiment is described by use of an example in which the whole hybrid vehicle 100 is controlled by the motor controller 8 and the vehicle controller 9. However, the present invention is not limited to this. A battery charging amount detection device for calculating a charging amount SOC of the battery 3 based on the detection signals of the voltage sensor 13 and the current sensor 14, an engine control device for controlling driving of the engine 1, a display control device for performing only a control on the display portion 10, and so on may be separately provided inside the vehicle controller 9.

The embodiment of the present invention has been described above, but the embodiment just shows some applications of the present invention and is not intended to limit the technical scope of the present invention to the concrete configurations of the embodiment. The values and the display modes in the embodiment are modifiable appropriately.

The invention claimed is:

1. A hybrid vehicle control method for a hybrid vehicle including a generator and an electric motor, the generator being configured to charge a battery by use of power of an engine, the electric motor being configured to drive driving wheels by electric power of the battery, the hybrid vehicle control method comprising:
   driving the engine at a first rotation speed when a charging amount of the battery decreases to a first charging threshold;
   changing the engine to driving at a second rotation speed larger than the first rotation speed when the engine is driven at the first rotation speed, regardless of an accelerator operation, and the charging amount decreases to a second charging threshold smaller than the first charging threshold;
   changing the engine to driving at the first rotation speed when the engine is driven at the second rotation speed, regardless of an accelerator operation, and the charging amount increases to a third charging threshold smaller than a charging end threshold; and
   stopping the engine when the charging amount becomes equal to or more than the charging end threshold larger than the first charging threshold, wherein
   the third charging threshold is larger than the first charging threshold.

2. The hybrid vehicle control method according to claim 1, wherein:
   the hybrid vehicle includes a display portion on which a state of the battery is displayed; and
   the hybrid vehicle control method further includes changing a display mode of the state of the battery on the display portion for a case where the engine is driven at the first rotation speed and for a case where the engine is driven at the second rotation speed.

3. The hybrid vehicle control method according to claim 1, further comprising:
   changing a display mode of the battery for a case where the charging amount increases, for a case where the charging amount decreases, and for a case where power generation is performed in the hybrid vehicle but the charging amount decreases.

4. A hybrid vehicle controller for a hybrid vehicle, the hybrid vehicle including a generator and an electric motor, the generator being configured to charge a battery by use of power of an engine, the electric motor being configured to drive driving wheels by electric power of the battery, the hybrid vehicle controller configured to:
   detect or estimate a charging amount of the battery;
   control a driving state of the engine based on the charging amount of the battery;
   drive the engine at a first rotation speed when the charging amount of the battery decreases to a first charging threshold;
   change the engine to driving at a second rotation speed larger than the first rotation speed when the engine is driven at the first rotation speed, regardless of an accelerator operation, and the charging amount of the battery decreases to a second charging threshold smaller than the first charging threshold;
   change the engine to driving at the first rotation speed when the engine is driven at the second rotation speed, regardless of an accelerator operation, and the charging amount increases to a third charging threshold smaller than a charging end threshold; and
   stop the engine when the charging amount becomes equal to or more than the charging end threshold larger than the first charging threshold,
   wherein the third charging threshold is larger than the first charging threshold.

5. The hybrid vehicle controller according to claim 4, wherein the hybrid vehicle further includes:
a display portion configured to display a state of the battery, the hybrid vehicle controller further configured to:
change a display mode of the state of the battery on the display portion for a case where the engine is driven at the first rotation speed and for a case where the engine is driven at the second rotation speed.

6. The hybrid vehicle controller according to claim 5, further configured to change the display mode of the battery on the display portion for a case where the charging amount increases, for a case where the charging amount decreases, and for a case where power generation is performed in the hybrid vehicle but the charging amount decreases.

* * * * *